United States Patent
Watabe et al.

(10) Patent No.: US 6,833,098 B2
(45) Date of Patent: Dec. 21, 2004

(54) METHOD OF REMOVING COVER OF GOLF BALL FROM CORE

(75) Inventors: Yasuhiro Watabe, Kobe (JP); Jun Yamakawa, Kobe (JP); Osamu Nishikawa, Kobe (JP); Masao Takami, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 423 days.

(21) Appl. No.: 09/961,491

(22) Filed: Sep. 25, 2001

(65) Prior Publication Data

US 2002/0056932 A1 May 16, 2002

(30) Foreign Application Priority Data

Sep. 28, 2000 (JP) ......................................... 2000-295493

(51) Int. Cl.$^7$ .......................... B29C 67/00; B29B 17/00
(52) U.S. Cl. .................... 264/139; 264/279.1; 264/911; 425/472; 156/344; 156/584
(58) Field of Search .................................. 264/921, 911, 264/279.1, 139; 425/289, 445, 446, 472; 156/344, 584

(56) References Cited

U.S. PATENT DOCUMENTS 5,389,169 A * 2/1995 McRae ........................ 156/98
5,976,430 A 11/1999 Kataoka et al.

* cited by examiner

Primary Examiner—Edmund H. Lee
(74) Attorney, Agent, or Firm—Birch, Stewart, Kolasch & Birch, LLP (57) ABSTRACT

A cover peeling machine includes a pair of rolls. The roll has an almost conical shape. Both of the rolls are rotated in a reverse direction. The direction of the rotation is an inward direction as seen from above. A golf ball is put close to a tip of the roll. In the vicinity of the tip, a distance between a nip of the roll and the golf ball is short. Therefore, a clip portion formed on the golf ball can be easily bitten between the rolls. With the rotation of the roll, a cover is peeled from a core. A groove formed on a surface of the roll can prevent the roll and the cover from slipping. After the removal, the cover and the core are recycled respectively.

16 Claims, 7 Drawing Sheets

METHOD OF REMOVING COVER OF GOLF BALL FROM CORE

BACKGROUND OF THE INVENTION

1. Field of the Invention

The present invention relates to a machine for peeling a cover of a golf ball, a method of removing the cover from a core, an apparatus for removing the cover from the core and a method of manufacturing a golf ball formed of a regenerated material.

2. Description of the Related Art

A golf ball is roughly divided into a wound ball and a solid ball. The solid ball comprises a core having a single or more rubber layers and a synthetic resin cover coated over a surface of the core. If the golf ball is used repetitively, the surface of the cover is damaged and dimples are also worn. As a result, the appearance is deteriorated and a flight distance is shortened during the lifetime of the ball. In view of this, most used golf balls are wasted. In recent years, a large amount of golf balls have been wasted with an increase in production of the golf ball, which has caused problems.

Japanese Laid-Open Patent Publication No. 10-137368 (1998/137368) has disclosed a method of collecting and regenerating used balls. In this method, a cover of the used ball having a damaged surface is peeled by means of a removing apparatus. A pair of cylindrical geared rolls which are mutually arranged in a transverse direction are used for the removing apparatus. Teeth are formed in an axial direction at a predetermined pitch over the circumferential surface of the roll and the roll is rotated inwardly with the teeth engaged with each other. A ball having a convex portion formed previously on a cover is mounted between the rolls which are being rotated. Consequently, the convex portion is bitten between the rolls and is thus pulled so that the cover is removed from a core. The cover thus removed is treated again and is utilized as a covering material.

In order to interpose the convex portion by mating the teeth with each other, it is necessary to press the rolls against each other and the teeth of the rolls are damaged easily. In addition, there is a possibility that the surface of the core might be damaged by the teeth during the removal.

Since the convex portion is formed by deforming the cover, a size thereof is restricted. For this reason, when the golf ball is put on the rolls, the convex portion cannot reach a roll nip and the cover cannot be removed in some cases. If a roll diameter is decreased, a distance between a lower end of the ball put on the roll and the nip of the rolls is reduced so that the convex portion is reliably bitten between the rolls. However, the roll having a small diameter is fragile so that troubles are practically made in respect of durability.

Furthermore, it is necessary to stably form a convex portion having a uniform dimension in order to reliably bite the convex portion, which cannot be carried out readily.

SUMMARY OF THE INVENTION

In consideration of such circumstances, it is an object of the present invention to remove a cover from a core simply and reliably and to use the core or the cover for a raw material of a regenerated golf ball.

In order to achieve the object, the present invention provides a cover peeling machine in which a pair of rolls provided close to each other are mutually rotated reversely to entangle a cover of a golf ball and to peel the cover from a core, wherein the roll is a tapered roll having a vertical angle of 20 degrees to 40 degrees.

In the cover peeling machine, the tip of the tapered roll has a small diameter. Therefore, in the case in which the golf ball is mounted close to the tip, a distance between the lower end of the ball and the nip of the roll is reduced. Accordingly, if a projection (clip portion) is previously formed on the cover, the roll can easily bite the clip portion. As a result, the cover is reliably entangled and is peeled from the core through the rotation of the roll. Moreover, the rear end of the roll has a large diameter and the rotary shaft of the roll can also have a large diameter. Therefore, it is also possible to support and rotate the roll like a cantilever. Furthermore, when the clip portion is once bitten into the nip, the cover is pulled obliquely downward. Consequently, the ball is moved toward the large diameter side over the roll. Thus, the cover can be peeled efficiently.

In order to achieve the object, another invention provides a cover peeling machine in which a pair of rolls provided close to each other are mutually rotated reversely to entangle a cover of a golf ball and to peel the cover from a core, wherein the roll is a tapered roll including a surfacing region having a surface subjected to a non-slip treatment and a tip of the surfacing region has a diameter of 15 mm or less.

Also in the cover peeling machine, the tip of the tapered roll has a small diameter. Therefore, the clip portion is easily bitten between the rolls. Moreover, the clip portion is bitten more reliably by the surfacing region (that is, the portion having the surface subjected to the non-slip treatment). If the tip of the surfacing region has a diameter of 15 mm or less, the clip portion can be bitten by the portion which has the non-slip treatment and in which the distance between the lower end of the ball and the nip is reduced.

The non-slip treatment implies a treatment in which concavo-convex portions are formed on the surface of the roll and to which grooving and knurling correspond. In the grooving, a large number of grooves are extended at regular intervals in an almost longitudinal direction of the roll. It is preferable that the space between the adjacent grooves should have a roll center angle of 6 degrees to 15 degrees.

It is preferable that the space between the rolls should be 0.05 to 0.9 time as great as a thickness of the cover. Consequently, an extremely great load (rolling load) is not applied to the roll, and furthermore, the roll and the cover can be prevented from slipping.

A method of manufacturing a golf ball according to the present invention comprises the step of coating another core with a resin composition containing, as a raw material, the cover obtained by the cover peeling machine described above. In this case, the core may be manufactured newly or may be collected from the used balls. The manufacturing method is excellent in resource saving and environmental maintenance.

Another method of manufacturing a golf ball according to the present invention comprises the step of coating, with a resin composition, the core from which the cover is peeled by means of one of the peeling machines described above. In this case, the resin composition for the cover may be manufactured newly or may be manufactured by utilizing a cover collected from the used balls. This manufacturing method is also excellent in resource saving and environmental maintenance.

In order to achieve the object, a further invention provides a method of removing a cover from a core comprising the steps of heating and softening a cover of a golf ball having a core and the cover, forming a clip portion by deforming and protruding a part of the softened cover, and peeling the cover from the core by entangling the formed clip portion in a pair of rolls, wherein at the softening step, the golf ball is put in a cup including an almost spherical cavity having a greater inside diameter than a diameter of the golf ball and a difference between the inside diameter and the diameter of the golf ball of 0.1 mm to 1.0 mm and is heated by thermal conduction from the cup, thereby softening the cover.

In the removing method, the cup including the cavity having a predetermined inside diameter is used at the softening step. Therefore, the heating can be efficiently carried out over the whole golf ball. Accordingly, the clip portion can be formed easily.

In order to achieve the object, a further invention provides a method of removing a cover from a core comprising the steps of heating and softening a cover of a golf ball having a core and the cover, forming a clip portion by deforming and protruding a part of the softened cover, and peeling the cover from the core by entangling the formed clip portion in a pair of rolls, wherein at the clip portion forming step, the cover is thinned and a thickness of a minimum thickness portion of the cover after the formation of the clip portion is 0.1 to 0.6 times as great as that of the cover before the formation of the clip portion.

In the removing method, the minimum thickness portion of the cover has a predetermined thickness after the clip portion is formed. Therefore, the cover can be peeled easily.

In order to achieve the object, a further invention provides a method of removing a cover from a core comprising the steps of heating and softening a cover of a golf ball having a core and the cover, forming a clip portion by deforming and protruding a part of the softened cover, and peeling the cover from the core by entangling the formed clip portion in a pair of rolls, wherein the clip portion formed at the clip portion forming step has a thickness of 2 mm to 6 mm and a width of 2 mm to 12 mm.

In the removing method, it is not very difficult to form the clip portion. In addition, the clip portion thus obtained can easily be bitten between the rolls.

In order to achieve the object, a further invention provides an apparatus for removing a cover of a golf ball from a core, comprising:

a softening station including an upper cup and a lower cup which have almost semispherical cavities, heating means and an ejector;

a clip portion forming station including an upper cup and a lower cup which have almost semispherical cavities, pressurizing means and an ejector;

a peeling station including one of the cover peeling machines described above, and ball pressing means; and automatic delivery means for holding the golf ball in the softening station and delivering the golf ball to the clip portion forming station, and holding the golf ball in the clip portion forming station and delivering the golf ball to the peeling station.

By the removing apparatus, the cover can be removed from the core efficiently without a manual operation.

Further scope of the applicability of the present invention will become apparent from the detailed description given hereinafter. However, it should be understood that the deatiled description and specific examples, while indicating preferred embodiments of the invention, are given by the way of illustration only, since various changes and modifications within the spirit and scope of the invetion will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

The present invention will be described below in detail based on a preferred embodiment with reference to the drawings.

Figure 1:
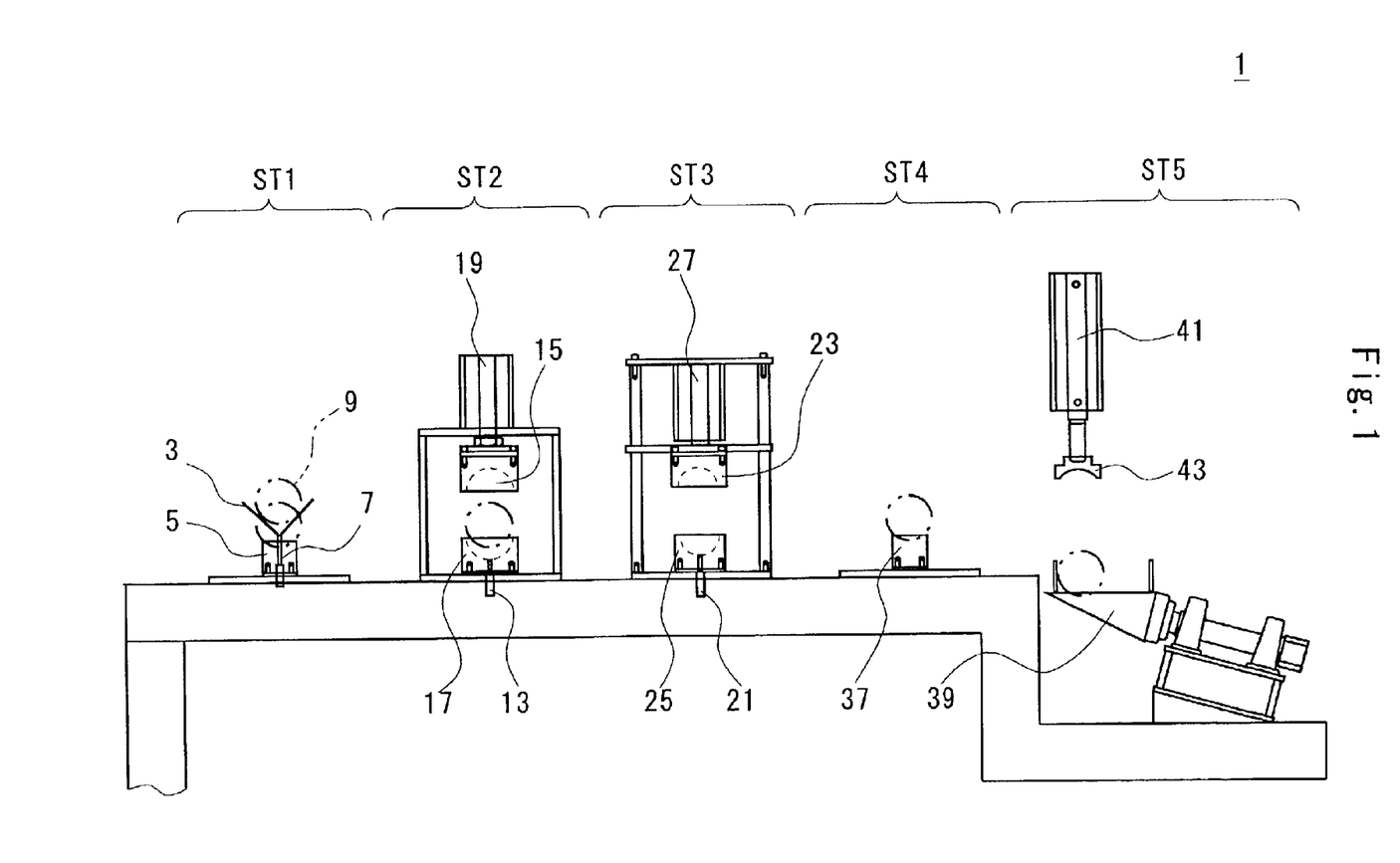
FIG. 1 is a typical front view showing a removing apparatus according to an embodiment of the present invention.
Figure 2:
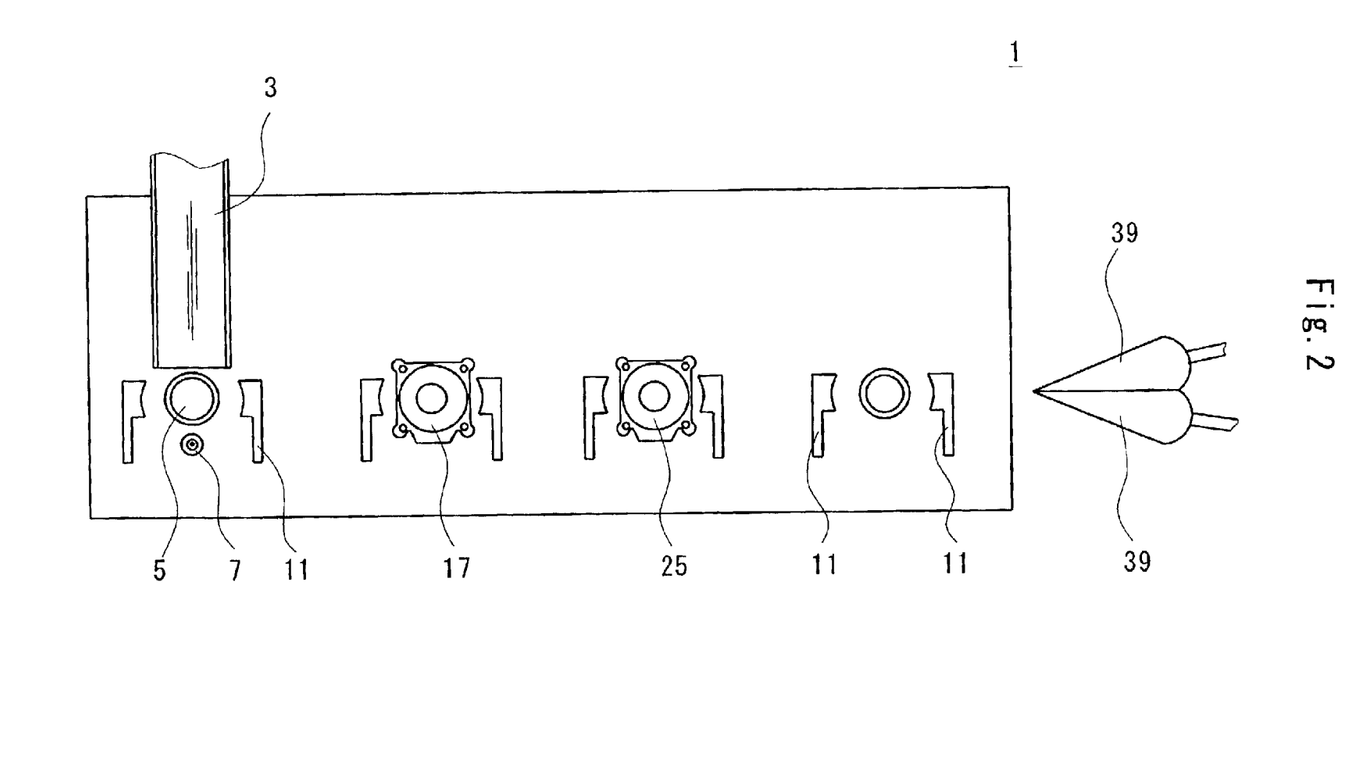
FIG. 2 is a typical plan view showing the removing apparatus in FIG. 1.

FIG. 1 is a typical front view showing a removing apparatus 1 according to an embodiment of the present invention. Moreover, FIG. 2 is a typical plan view showing the removing apparatus 1 in FIG. 1. The removing apparatus 1 comprises a first station (ST1), a second station (ST2), a third station (ST3), a fourth station (ST4) and a fifth station (ST5). The second station (ST2) is a softening station, the third station (ST3) is a clip portion forming station and the fifth station (ST5) is a peeling station.

The first station (ST1) includes a shooter 3 having a V-shaped section, a receiving table 5 and a stop pin 7. Balls 9 roll over the shooter 3 one by one and are then supplied toward the receiving table 5. When the ball 9 reaches the tip of the shooter 3, the stop pin 7 is extended upward so that the ball 9 becomes stationary on the receiving table 5 by the stop pin 7. The ball 9 is held by a pair of right and left air chucks 11. The air chucks 11 are fed at a predetermined pitch through a cylinder which is not shown and are moved to the second station (ST2). The air chuck 11 and the cylinder constitute automatic delivery means. By the automatic delivery means, the balls 9 are fed to the second station (ST2).

The second station (ST2) includes a projection pin 13 to be an ejector, an upper cup 15, a lower cup 17 and a cylinder 19. An electric heater to be heating means is wound upon the outer periphery of the upper cup 15 and the lower cup 17, which is not shown. Both the upper cup 15 and the lower cup 17 include almost semispherical cavities.

The ball 9 delivered from the first station (ST1) is first mounted on the lower cup 17. Next, the upper cup 15 is brought down by means of the cylinder 19 so that the ball 9 is accommodated in the upper and lower cups 15 and 17. Heat is transferred to the ball 9 through the cups 15 and 17 by means of the electric heater. Consequently, a cover is softened. A heating temperature (a temperature of the electric heater) is set to be slightly higher than a softening point of the cover. More specifically, it is preferable that heating should be carried out at a higher temperature than the softening point by approximately 5° C. to 30° C. In the case of a cover containing an ionomer resin as a principal component, it is preferable that the heating should be carried out for 5 seconds to 40 seconds, particularly, 10 seconds to 30 seconds at a temperature of approximately 120° C. to 160° C., particularly, 130° C. to 150° C. If the heating temperature is too low or the time required for the heating is too short, the cover is not sufficiently softened and it is hard to form a clip portion at a subsequent step in some cases. If the heating temperature is too high or the time required for the heating is too long, the core causes a thermal degradation in some cases.

The cavities of the upper and lower cups 15 and 17 have inside diameters which are slightly larger than the diameter of the ball 9. More specifically, a difference between the inside diameters of the cavities and the diameter of the ball 9 is 0.1 mm to 1.0 mm, particularly, 0.1 mm to 0.3 mm. If the difference is less than the above-mentioned range, the balls 9 cannot be wholly accommodated in the cups 15 and 17. As a result, a part of the cover is not softened in some cases. If the difference is more than the above-mentioned range, a great gap is formed between the cups 15 and 17 and the ball 9 so that a thermal conductivity is deteriorated in some cases.

After the heating, the upper cup 15 is lifted by the cylinder 19. Almost simultaneously, the projection pin 13 penetrating through the lower cup 17 is extended upward so that the ball 9 is removed from the lower cup 17. If a mold releasing treatment such as Teflon coating is applied to the inner peripheral surfaces of the cups 15 and 17, the ball 9 can be removed more easily. The ball 9 removed from the lower cup 17 is held by the air chuck 11 and is delivered to the third station (ST3).

The third station (ST3) includes a projection pin 21 to be an ejector, an upper cup 23, a lower cup 25 and a cylinder 27 to be pressurizing means. Both the upper cup 23 and the lower cup 25 include almost semispherical cavities. The cavities have inside diameters which are smaller than the diameter of the ball 9 and are larger than the diameter of a core. An electric heater to be heating means is wound upon the outer periphery of the upper cup 23 and the lower cup 25 and the upper cup 23 and the lower cup 25 are heated, which is not shown. A heating temperature is equivalent to that for each of the cups 15 and 17 in the second station (ST2).

The ball 9 delivered from the second station (ST2) is first mounted on the lower cup 25. Since the inside diameter of the cavity is smaller than the diameter of the ball 9 as described above, the lower end of the ball 9 floats from the lower cup 25. Next, the upper cup 23 is brought down by the cylinder 27. Consequently, the cover is deformed to be gradually scooped away through front edges of the upper and lower cups 23 and 25. Even if the upper cup 23 reaches the lowest point, the upper cup 23 does not abut on the lower cup 25 and a clearance is formed between the cups 23 and 25. The softened cover flows toward the clearance. The cups 23 and 25 are pressurized by force of approximately 300N to 800N. The pressurization is carried out for approximately 5 to 60 seconds, particularly, 10 to 30 seconds.

After the pressurization, the upper cup 23 is lifted by the cylinder 27. Almost simultaneously, the projection pin 21 penetrating through the lower cup 25 is extended upward so that the ball 9 is removed from the lower cup 25. If a mold releasing treatment such as Teflon coating is applied to the inner peripheral surfaces of the cups 23 and 25, the ball 9 can be removed more easily. The ball 9 removed from the lower cup 25 is held by the air chuck 11 and is delivered to the fourth station (ST4).

Figure 3:
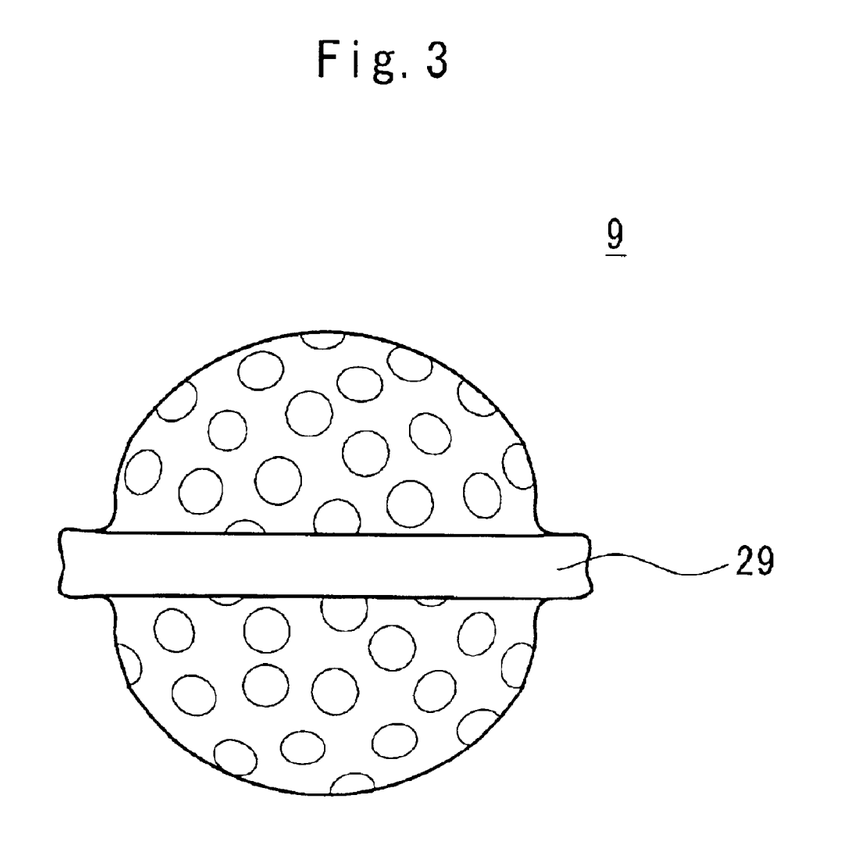
FIG. 3 is a front view showing a ball which has completely been treated in a third station of the removing apparatus in FIG. 1.

FIG. 3 is a front view showing the ball 9 which has completely been treated at the third station (ST3). The cover flows to a portion corresponding to the clearance generated between the upper and lower cups 23 and 25 so that a clip portion 29 is formed. The clip portion 29 is almost annular. At a peeling step which will be described below in detail, a cover is peeled by the influence of the clip portion 29.

Figure 4:
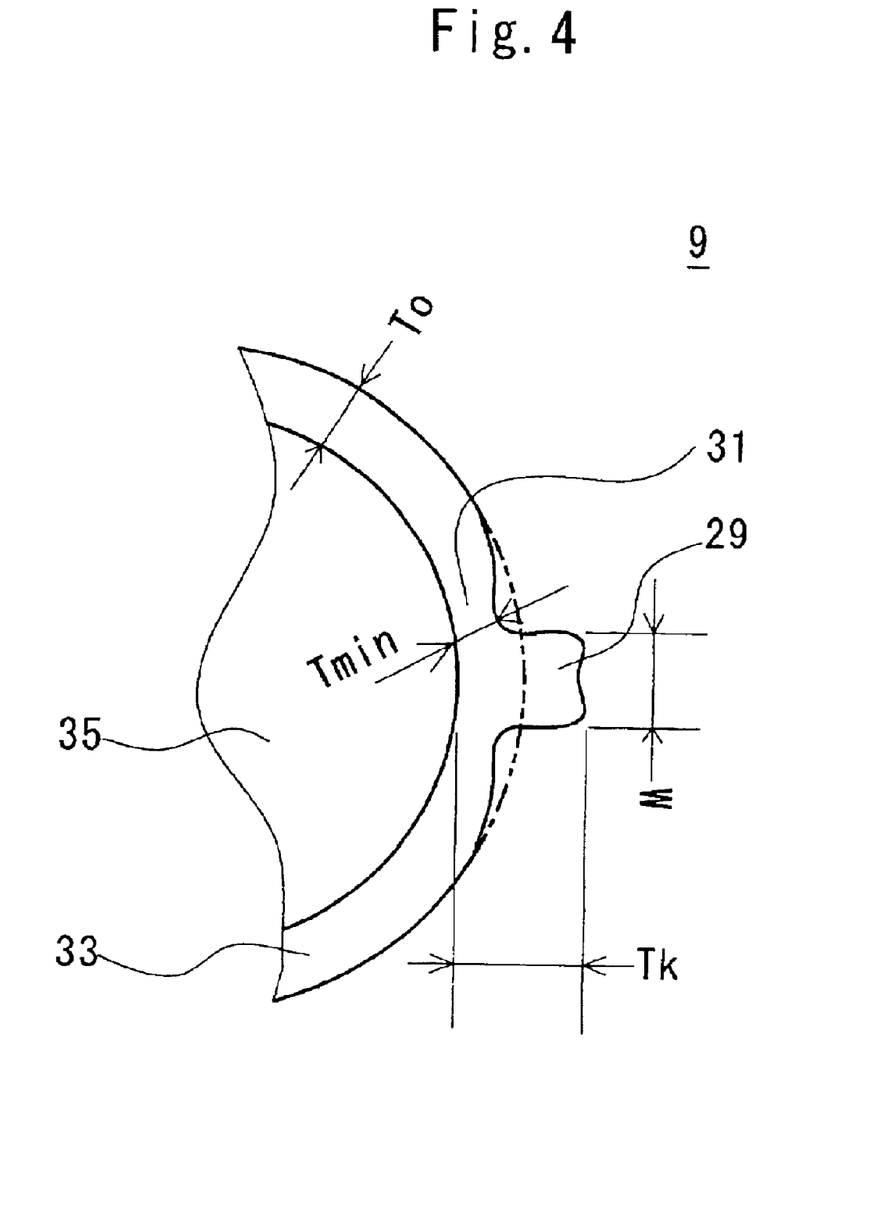
FIG. 4 is an enlarged sectional view showing a part of the ball in FIG. 3.

FIG. 4 is an enlarged sectional view showing a part of the ball 9 in FIG. 3. In FIG. 4, the vicinity of the clip portion 29 is shown. The upper and lower parts of the clip portion 29 are scooped away through the cups 23 and 25 so that a thinned portion 31 is formed. When the clip portion 29 is pulled at the subsequent peeling step, a crack is generated in the thinned portion 31 so that a cover 33 is gradually peeled by using the crack as an origin. The thinned portion 31 is present over the whole periphery of the ball 9. Therefore, the cover 33 can easily be peeled.

It is preferable that a thickness of a minimum thickness portion (shown by arrow Tmin in FIG. 4) should be 0.1 to 0.6 times, particularly, 0.2 to 0.4 times as large as that of the cover before the formation of the clip portion 29 (which is shown by arrow To in FIG. 4). In the case in which the thickness of the minimum thickness portion is less than the above-mentioned range, it is hard to form the clip portion 29 without damaging a core 35. In some cases, moreover, only the clip portion 29 is torn when it is pulled at the subsequent peeling step. In the case in which the thickness of the minimum thickness portion is more than the above-mentioned range, it is necessary to pull the clip portion 29 by extremely great force at the subsequent peeling step.

It is preferable that the thickness of the clip portion 29 (which is shown by arrow Tk in FIG. 4) should be 2 mm to 6 mm, particularly, 3 mm to 4 mm. If the thickness Tk is less than the above-mentioned range, the clip portion 29 is not bitten between the rollers at the subsequent peeling step. If the thickness Tk is more than the above-mentioned range, a long time is required for forming the clip portion 29 or a formation temperature is to be raised. In some cases, consequently, the thermal degradation of the core 35 is promoted.

It is preferable that the width of the clip portion 29 (which is shown by arrow W in FIG. 4) should be 2 mm to 12 mm, particularly, 3 mm to 10 mm. In some cases in which the width W is less than the above-mentioned range, it is hard to form a thinned portion 31 having a sufficiently small thickness. In some cases in which the width W is more than the above-mentioned range, the clip portion 29 is not bitten between the rollers at the subsequent peeling step.

In order to obtain such a clip portion 29, the cups 23 and 25 including cavities having inside diameters which are slightly greater than the diameter of the core 35 are used. More specifically, it is preferable that a difference between the diameters should be 0.2 mm to 2.0 mm, particularly, 0.2 mm to 1.0 mm. In some cases in which the difference is less than the above-mentioned range, the thinned portion 31 becomes extremely thin or the core 35 is damaged. To the contrary, in some cases in which the difference is more than the above-mentioned range, it is hard to form the thinned portion 31 having a sufficiently small thickness.

The fourth station (ST4) includes a receiving table 37. The delivered ball 9 is put on the receiving table 37. The fourth station (ST4) is a station for standby, in which any treatment for the ball 9 is not carried out. The fourth station (ST4) may be omitted.

The fifth station (ST5) includes a pair of rolls 39 and 39 to be a peeling machine, a presser cylinder 41 to be ball pressing means and an abutment cup 43. The rolls 39 and 39 are rotated inwardly as seen from above. The ball 9 delivered to the fifth station (ST5) through the air chuck 11 is first put on the roll 39. Immediately thereafter, the presser cylinder 41 is extended downward and the abutment cup 43 abuts on the ball 9 so that the ball 9 is pushed against the roll 39. Consequently, the clip portion 29 (see FIG. 4) is bitten between the rolls 39 and 39 and is pulled downward. The cover 33 is gradually entangled in the rolls 39 and 39 by the influence of the clip portion 29, and is thereby peeled from the core 35. Thus, the cover 33 is removed from the core 35. The core 35 and the cover 33 are collected separately by collecting means which is not shown and are then recycled respectively. It is preferable that the axial direction of the roll 39 should be adjusted such that the ball 9 put on the roll 39 rolls down with difficulty.

Figure 5:
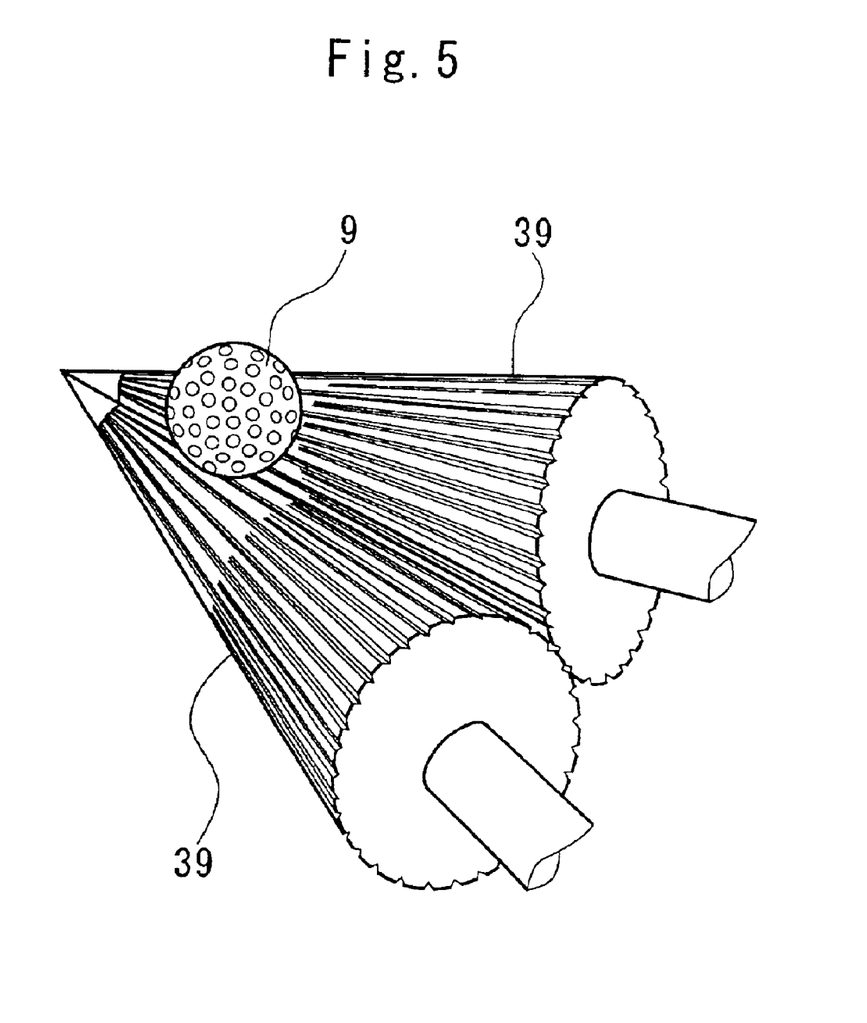
FIG. 5 is a perspective view showing a peeling machine of the removing apparatus in FIG. 1.
Figure 6:
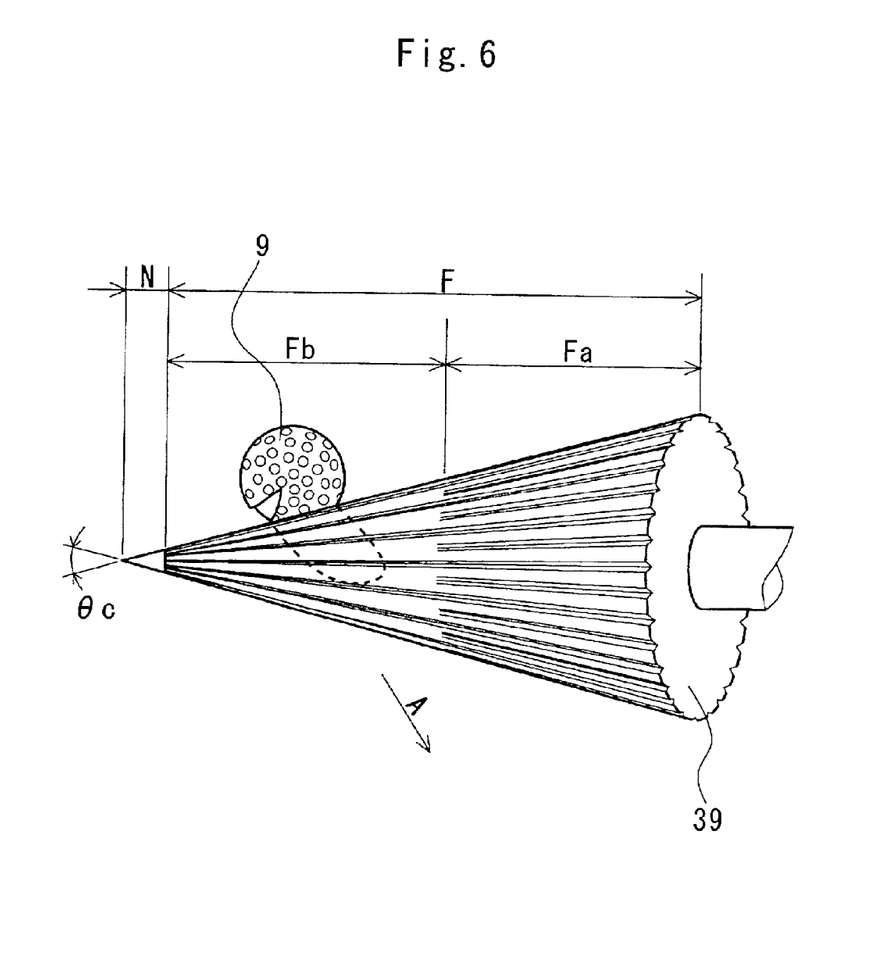
FIG. 6 is an enlarged view showing a part of the peeling machine in FIG. 5.

FIG. 5 is a perspective view showing the peeling machine. FIG. 6 is an enlarged view showing a part of the peeling machine in FIG. 5. As is apparent from these drawings, the roll 39 is conical. The ball 9 is first put in the vicinity of the tip of the roll 39 (on the left side in FIG. 6). Since the diameter of the roll 39 is small in the vicinity of the tip, a distance between the lower end of the ball 9 and a nip of the roll 39 is shortened. Accordingly, even if the thickness Tk of the clip portion 29 is not very great, the clip portion 29 is reliably bitten between the rolls 39. Since the circumferential speed of the rolls 39 is increased toward a rear end, force acts on the ball 9 obliquely downward as shown in an arrow A in FIG. 6. Accordingly, as the cover 33 is more peeled, the ball 9 is moved toward the rear end. The circumferential speed is high in the vicinity of the rear end as described above. Therefore, the cover 33 is peeled efficiently. Even if a truncated conical roll is used, the same effects can be obtained. In this specification, both the conical roll 39 and the truncated conical roll are referred to as tapered rolls.

The outer peripheral surface of the roll 39 is distinguished into a surfacing region F and a non-surfacing region N. The non-surfacing region N is positioned in the vicinity of a tip. Moreover, the surfacing region F is distinguished into a first surfacing region Fa on the rear side and a second surfacing region Fb on the tip side. The surfacing region F is subjected to grooving. By the grooving, a coefficient of friction of the cover 33 and the roll 39 can be enhanced so that a slip thereof can be prevented.

Figure 7:
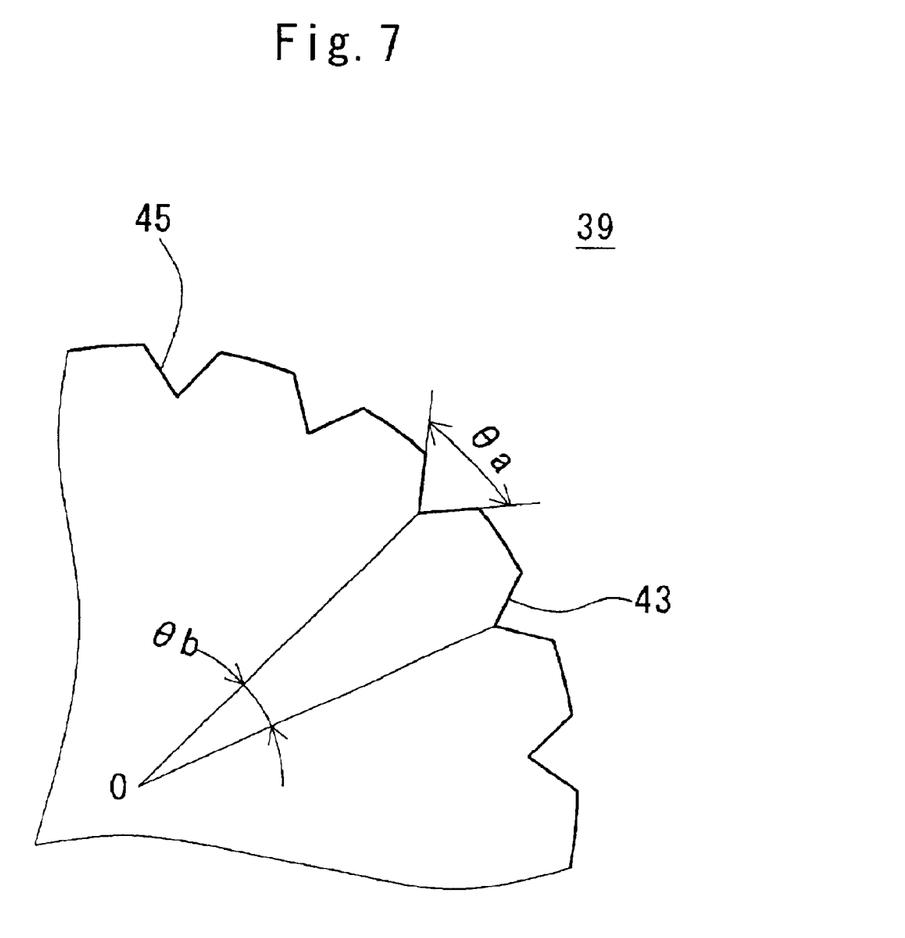
FIG. 7 is an enlarged sectional view showing a part of a roll of the peeling machine in FIG. 5.

FIG. 7 is an enlarged sectional view showing a part of the roll 39. As is apparent from FIG. 7, a groove 45 has a V-shaped section. If the groove 45 has a vertical angle θa of 60 degrees to 120 degrees, particularly, 80 degrees to 100 degrees, the cover 33 is clogged in the groove 45 with difficulty and the core 35 can be prevented from being damaged. It is preferable that the groove 45 should have a depth of 1.0 mm to 2.0 mm, particularly, 1.3 mm to 1.5 mm. If the depth is less than the above-mentioned range, the cover 33 and the roll 39 slip easily. If the depth is more than the above-mentioned range, the cover 33 is clogged in the groove 45 or the core 35 is damaged in some cases. While the groove 45 may have a U-shaped section or a concave shape, the V-shaped groove 45 is preferable in respect of the prevention of the clogging of the cover 33 or that of the damage of the core 35. Even if knurling is carried out in place of the grooving, the cover 33 and the roll 39 can be prevented from slipping.

It is preferable that a pitch (a center angle pitch θb) between the grooves 45 and 45 based on the roll center angle should be 6 degrees to 15 degrees, particularly, 6 degrees to 9 degrees. In some cases in which the center angle pitch θb is less than the above-mentioned range, the grooving is hard to perform. If the center angle pitch θb is more than the above-mentioned range, the cover 33 and the roll 39 slip easily.

As is apparent from FIG. 6, the center angle pitch θb of the second surfacing region Fb is greater than the center angle pitch θb of the first surfacing region Fa (double). Since the second surfacing region Fb has a small circumferential length, the groove 45 is densified even if the center angle pitch θb is great and the adjacent grooves 45 and 45 overlap if the center angle pitch θb of the second surfacing region Fb is small. It is preferable that the center angle pitch θb should be set to the above-mentioned range in both the first surfacing region Fa and the second surfacing region Fb. The grooves 45 are not formed in the non-surfacing region N because overlapping is always caused during the formation.

It is preferable that the vertical angle of the roll 39 (which is indicated as θc in FIG. 6) should be 20 degrees to 40 degrees, particularly, 24 degrees to 30 degrees. If the vertical angle θc is less than the above-mentioned range, the efficiency of peeling of the cover 33 is reduced in some cases. In some cases in which the vertical angle θc is more than the above-mentioned range, the clip portion 29 is bitten between the rolls 39 with difficulty.

It is preferable that the whole length of the roll 39 should be 100 mm to 300 mm, particularly, 100 mm to 150 mm. If the whole length is less than the above-mentioned range, it is difficult to obtain such an effect that the clip portion 29 is bitten in the vicinity of the tip to efficiently peel the cover 33 in the vicinity of the rear end. If the whole length is more than the above-mentioned range, the space between the rolls 39 and 39 cannot be maintained in the vicinity of the tip because of a cantilever roll.

It is preferable that the diameter of the roll 39 on the tip of the surfacing region F (that is, a boundary between the surfacing region F and the non-surfacing region N) should be 15 mm or less, furthermore 10 mm or less, and particularly 3 mm or less. Consequently, the distance between the lower end of the ball 9 and the nip of the rolls 39 and 39 is shortened so that the clip portion 29 is easily bitten between the rolls 39. In respect of easiness of the grooving, the diameter is usually 2.0 mm or more.

It is preferable that the rotating speed of the roll 39 should be 6 rpm to 60 rpm, particularly, 6 rpm to 20 rpm. If the rotating speed is less than the above-mentioned range, a long time is required for peeling the cover 33. In some cases in which the rotating speed is more than the above-mentioned range, the clip portion 29 is bitten between the rolls 39 with difficulty due to a slip.

It is preferable that the space between the rolls 39 and 39 should be 0.05 to 0.9 time, particularly, 0.1 to 0.5 time as great as a thickness To of the cover 33. If the space is less than the above-mentioned range, the clip portion 29 is not bitten between the rolls 39 in some cases. If the space is more than the above-mentioned range, the cover 33 and the roll 39 cause a slip in some cases.

The core 35 from which the cover 33 is peeled is recycled. More specifically, the core 35 is covered with a new cover by a well-known method (for example, an injection molding method) so that a regenerated rubber ball is manufactured.

On the other hand, the peeled cover 33 is ground, heated and molten and is thus recycled as a resin material. Various resin molded products can be obtained from the resin material. For example, the resin material may be recycled as a golf ball cover.

A resin material (a regenerated resin) obtained from the collected cover 33 may be used for a material of a cover to be coated over the collected core 35 and a newly produced resin material (a virgin resin) may be used, and furthermore, both may be mixed and used. Moreover, the resin material regenerated from the collected cover 33 may be covered over a newly manufactured core or the collected core 35. While a marking layer and a coated layer are formed on the surface of the ball 9, these may be removed before or after the cover 33 is peeled. As a matter of course, the cover 33 may be recycled with the marking layer and the coated layer provided for the use in which a quality is not deteriorated.

EXAMPLES

A two-piece golf ball (having a diameter of 42.7 mm) comprising a core having a diameter of 38.9 mm formed of a solid rubber and a cover having a thickness of 1.9 mm and containing an ionomer resin as a principal component was prepared. The cover was removed from the core by the removing apparatus shown in FIGS. 1 and 2 in the following procedure.

First of all, a ball delivered from a first station was heated in a second station. A cup having an inside diameter of 43.0 mm and a cavity surface coated with Teflon was used. A heating temperature was set to 140° C. and a time required for heating was set to approximately 20 seconds.

Next, a clip portion was formed in the second station. A cup having an inside diameter of 39.0 mm and a cavity surface coated with Teflon was used. A temperature of the cup was set to 140° C. and approximately 20 seconds were taken to form the clip portion. The clip portion thus obtained had a thickness Tk of approximately 4 mm and a width W of approximately 10 mm.

In a fifth station, subsequently, the cover was peeled by means of a conical roll. The specification of the used roll is as follows.

| | |
|---|---|
| Diameter of rear end: | 58 mm |
| Vertical angle θc: | 29.6 degrees |
| Whole length: | 110 mm |
| Length of first surfacing region Fa: | 50 mm |
| Length of second surfacing region Fb: | 55 mm |
| Length of non-surfacing region N: | 5 mm |
| Non-slip treatment: | V-shaped grooving |
| Vertical angle θa of groove: | 90 degrees |
| Depth of groove: | 1.0 mm |
| Center angle pitch of first surfacing region Fa: | 15.0 degrees |
| Center angle pitch of second surfacing region Fb: | 7.5 degrees |

The clip portion was reliably bitten between the rolls, and furthermore, a slip between the cover and the roll was not generated. The cover was smoothly removed from the core.

The above description is only illustrative and various changes can be made without departing from the scope of the invention.

What is claimed is:

1. A method of manufacturing a golf ball comprising the steps of:
   (1) peeling a cover from a core by means of a cover peeling machine comprising a pair of tapered rolls which are provided close to each other, are mutually rotated reversely and have vertical angles of 20 degrees to 40 degrees; and
   (2) coating another core with a resin composition containing the obtained cover as a raw material.

2. A method of manufacturing a golf ball comprising the seeps of:
   (1) peeling a cover from a core by means of a cover peeling machine comprising a pair of tapered rolls which are provided close to each other, are mutually rotated reversely and include surfacing regions having surfaces subjected to a non-slip treatment, the tips of the surfacing regions having diameters of 15 mm or less; and
   (2) coating another core with a resin composition containing the obtained cover as a raw material.

3. A method of manufacturing a golf ball comprising the steps of:
   (1) peeling a cover from a core by means of a cover peeling machine comprising a pair of tapered rolls which are provided close to each other, are mutually rotated reversely and have vertical angles of 20 degrees to 40 degrees; and
   (2) coating the core with a resin composition for a cover.

4. A method of manufacturing a golf ball comprising the steps of:
   (1) peeling a cover from a core by means of a cover peeling machine comprising a pair of tapered rolls which are provided close to each other, are mutually rotated reversely and include surfacing regions having surfaces subjected to a non-slip treatment, the tips of the surfacing regions having diameters of 15 mm or less; and
   (2) coating the core with a resin composition for a cover.

5. The method according to claim 1, further comprising the steps of:
   heating and softening the cover of the golf ball; and
   forming a clip portion by deforming and protruding a part of the softened cover,
   wherein said step of peeling further includes peeling the cover from the core by entangling the formed clip portion in the pair of rolls, and
   wherein at the softening step, the golf ball is put in a cup including an almost spherical cavity having a greater inside diameter than a diameter of the golf ball and a difference between the inside diameter and the diameter of the golf ball of 0.1 mm to 1.0 mm and is heated by the thermal conduction from the cup, thereby softening the cover.

6. The method according to claim 2, further comprising the steps of:
   heating and softening the cover of the golf ball; and
   forming a clip portion by deforming and protruding a part of the softened cover,
   wherein said step of peeling further includes peeling the cover from the core by entangling the formed clip portion in the pair of rolls, and
   wherein at the softening step, the golf ball is put in a cup including an almost spherical cavity having a greater inside diameter than a diameter of the golf ball and a difference between the inside diameter and the diameter of the golf ball of 0.1 mm to 1.0 mm and is heated by thermal conduction from the cup, thereby softening the cover.

7. The method according to claim 3, further comprising the steps of:

heating and softening the cover of the golf ball; and forming a clip portion by deforming and protruding a part of the softened cover, wherein said step of peeling further includes peeling the cover from the core by entangling the formed clip portion in the pair of rolls, and wherein at the softening step, the golf ball is put in a cup including an almost spherical cavity having a greater inside diameter than a diameter of the golf ball and a difference between the inside diameter and the diameter of the golf ball of 0.1 mm to 1.0 mm and is heated by thermal conduction from the cup, thereby softening the cover.

8. The method according to claim 4, further comprising the steps of:

heating and softening the cover of the golf ball; and forming a clip portion by deforming and protruding a part of the softened cover, wherein said step of peeling further includes peeling the cover from the core by entangling the formed clip portion in the pair of rolls, and wherein at the softening step, the golf ball is put in a cup including an almost spherical cavity having a greater inside diameter than a diameter of the golf ball and a difference between the inside diameter and the diameter of the golf ball of 0.1 mm to 1.0 mm and is heated by thermal conduction from the cup, thereby softening the cover.

9. The method according to claim 1, further comprising the steps of:

heating and softening the cover of the golf ball; and forming a clip portion by deforming and protruding a part of the softened cover, wherein said step of peeling further includes peeling the cover from the core by entangling the formed clip portion in the pair of rolls, and wherein at the clip portion forming step, the cover is thinned and a thickness of a minimum thickness portion of the cover after the formation of the clip portion is 0.1 to 0.6 times as great as that of the cover before the formation of the clip portion.

10. The method according to claim 2, further comprising the steps of:

heating and softening the cover of the golf ball; and forming a clip portion by deforming and protruding a part of the softened cover, wherein said step of peeling further includes peeling the cover from the core by entangling the formed clip portion in the pair of rolls, and wherein at the clip portion forming step, the cover is thinned and a thickness of a minimum thickness portion of the cover after the formation of the clip portion is 0.1 to 0.6 times as great as that of the cover before the formation of the clip portion.

11. The method according to claim 3, further comprising the steps of:

heating and softening the cover of the golf ball; and forming a clip portion by deforming and protruding a part of the softened cover, wherein said step of peeling further includes peeling the cover from the core by entangling the formed clip portion in the pair of rolls, and wherein at the clip portion forming step, the cover is thinned and a thickness of a minimum thickness portion of the cover after the formation of the clip portion is 0.1 to 0.6 times as great as that of the cover before the formation of the clip portion.

12. The method according to claim 4, further comprising the steps of:

heating and softening the cover of the golf ball; and forming a clip portion by deforming and protruding a part of the softened cover, wherein said step of peeling further includes peeling the cover from the core by entangling the formed clip portion in the pair of rolls, and wherein at the clip portion forming step, the cover is thinned and a thickness of a minimum thickness portion of the cover after the formation of the clip portion is 0.1 to 0.6 times as great as that of the cover before the formation of the clip portion.

13. The method according to claim 1, further comprising the steps of:

heating and softening the cover of the golf ball; and forming a clip portion by deforming and protruding a part of the softened cover, wherein said step of peeling further includes peeling the cover from the core by entangling the formed clip portion in the pair of rolls, and wherein the clip portion formed at the clip portion forming step has a thickness of the 2 mm to 6 mm and a width of 2 mm to 12 mm.

14. The method according to claim 2, further comprising the steps of:

heating and softening the cover of the golf ball; and forming a clip portion by deforming and protruding a part of the softened cover, wherein said step of peeling further includes peeling the cover from the core by entangling the formed clip portion in the pair of rolls, and wherein the clip portion formed at the clip portion forming step has a thickness of the 2 mm to 6 mm and a width of 2 mm to 12 mm.

15. The method according to claim 3, further comprising the steps of:

heating and softening the cover of the golf ball; and forming a clip portion by deforming and protruding a part of the softened cover, wherein said step of peeling further includes peeling the cover from the core by entangling the formed clip portion in the pair of rolls, and wherein the clip portion formed at the clip portion forming step has a thickness of the 2 mm to 6 mm and a width of 2 mm to 12 mm.

16. The method according to claim 4, further comprising the steps of:

heating and softening the cover of the golf ball; and forming a clip portion by deforming and protruding a part of the softened cover, wherein said step of peeling further includes peeling the cover from the core by entangling the formed clip portion in the pair of rolls, and wherein the clip portion formed at the clip portion forming step has a thickness of the 2 mm to 6 mm and a width of 2 mm to 12 mm.

* * * * *